United States Patent [19]

Maisch

[11] Patent Number: 4,568,876
[45] Date of Patent: Feb. 4, 1986

[54] METHOD FOR TESTING THE CORRECT POSITION OF A WIPER OF AN ELECTRIC POTENTIOMETER AND ELECTRIC POTENTIOMETER FOR PERFORMING THE METHOD

[75] Inventor: Wolfgang Maisch, Schwieberdingen, Fed. Rep. of Germany

[73] Assignee: Robert Bosch GmbH, Stuttgart, Fed. Rep. of Germany

[21] Appl. No.: 534,456

[22] Filed: Sep. 21, 1983

[30] Foreign Application Priority Data

Nov. 22, 1982 [DE] Fed. Rep. of Germany ....... 3243126

[51] Int. Cl.$^4$ .......................... G01R 27/02; H01C 1/12
[52] U.S. Cl. ......................................... 324/63; 324/74; 338/202; 338/171
[58] Field of Search .......................... 324/63, 74, 421; 338/202, 171; 323/298, 353

[56] References Cited

U.S. PATENT DOCUMENTS 3,343,115 9/1967 Greenwood .................... 338/202 X

Primary Examiner—Reinhard J. Eisenzopf
Assistant Examiner—Jack B. Harvey
Attorney, Agent, or Firm—Edwin E. Greigg

[57] ABSTRACT

A method for testing the correct position of a wiper of an electric potentiometer and an electric potentiometer for performing the method are proposed. The electric potentiometer includes a wiper lever with brush wipers, which upon a rotational movement about a pivot shaft brush over two work sections of an electrically conductive layer applied to a carrier plate. One of the work sections communicates on one side with a connection layer and on the other with a grounded connection layer, which the other work section communicates with a pickup connection layer. Respective testing faces are provided in the extension of the permissible movement paths of the brush wipers on the work sections, these testing faces being embodied as electrically non-conductive and in a testing position of the wiper lever being crossed by the wiper lever. In the event of an incorrect position, a portion of the brush wipers in the testing position of the wiper lever is located outside the test faces, and the voltage which can be picked up at the pickup connection layer is then zero.

5 Claims, 1 Drawing Figure

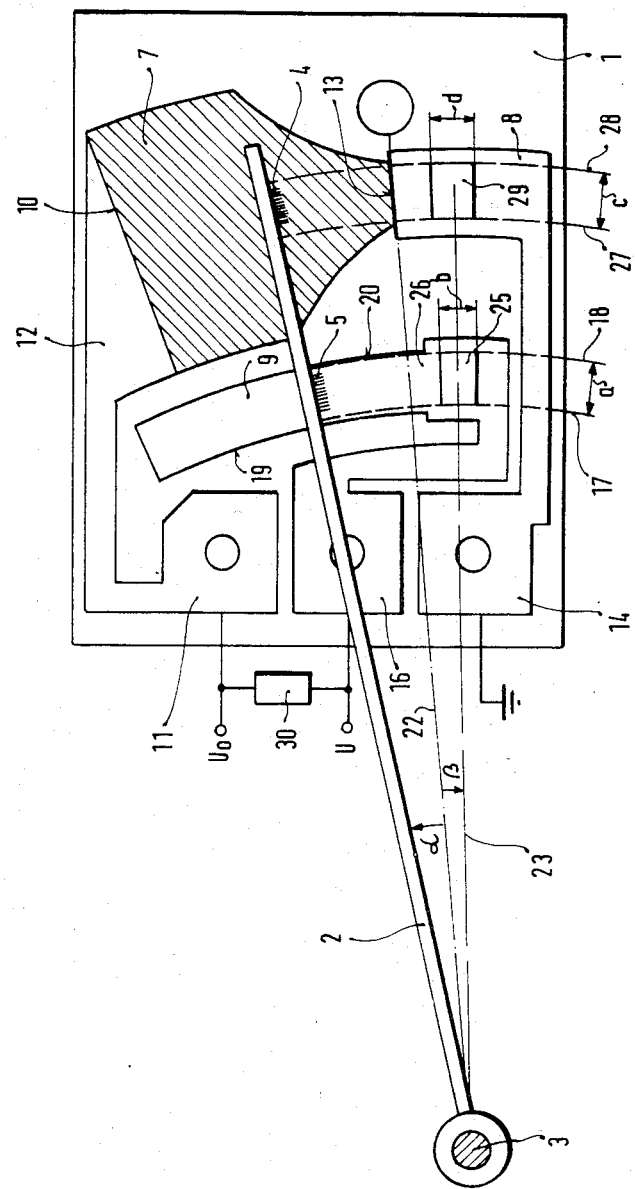

METHOD FOR TESTING THE CORRECT POSITION OF A WIPER OF AN ELECTRIC POTENTIOMETER AND ELECTRIC POTENTIOMETER FOR PERFORMING THE METHOD

BACKGROUND OF THE INVENTION

The invention is based on a method as generally defined hereinafter. Potentiometers have already been proposed in which in the installed state it is no longer possible to perform mechanical or optical monitoring as to whether the wiper is properly following its permitted path along the electrically conductive layer. If the movement path of the wiper deviates from the permissible one, then part of the wiper will travel over the carrier material, which is usually ceramic, and become roughened on its surface. The result is that the roughened wiper wears out the electrically conductive layer more rapidly.

OBJECT AND SUMMARY OF THE INVENTION

The method according to the invention for testing the correct position of a wiper of an electric potentiometer as disclosed in claim 1 has the advantage that it can be ascertained without great expense whether the wiper is assuming its correct position, and corrections in the position of the wiper can be made as needed, even if optical or mechanical monitoring is no longer possible. The electric potentiometer according to the invention has the advantage that with simple means, a potentiometer is created in which testing of the correct position of the wiper is possible without mechanical or optical monitoring.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows one exemplary embodiment of an electric potentiometer according to the invention, which is described in detail below.

DESCRIPTION OF THE PREFERRED EMBODIMENT

In the drawing, an electric potentiometer with a carrier plate 1 which is not electrically conductive and a wiper lever 2 is shown; the carrier plate 1 is fabricated of ceramic material by way of example. The wiper lever 2 is supported to be pivotable about a pivot shaft 3 and upon executing a rotation about the pivot shaft 3 brushes along electrically conductive layers 7, 8, 9, 26, which are applied to the carrier plate 1 by known methods, for example with brush wipers 4 and 5. The work section 7 of the electrically conductive layers, shown by shading in the drawing, is capable of being stroked by the brush wiper 4 and is embodied as a resistance layer, which at one end 10 communicates with a connecting layer 12 leading to a connection layer 11 and at the other, narrower end 13 communicates with the connecting layer 8, which leads to a grounded connection layer 14. The supply voltage $U_o$ is applied to the connection layer 11. The brush wipers 4 and 5 are connected with one another in an electrically conductive manner and the work section 9 stroked by the brush wiper 5 communicates with a pickup connection layer 16, at which the measurement voltage U at a given time can be picked up. If the brush wiper 5 is in its correct position, the brush wiper 5 moves along a permissible movement path having the width a, which is narrower than the work section 9 and is defined by circular arcs 17 and 18 around the pivot axis 3; the circular arc 17 has a somewhat larger radius than that of the limiting line 19 oriented toward the pivot shaft 3, and the circular arc 18 has a somewhat shorter radius than that of the limiting line 20 of the work section 9 remote from the pivot shaft 3. In its position of rest, the wiper lever 2 assumes a position which corresponds to the dot-dash line 22 and passes through the end 13 of the resistance layer 7. The measurement movement direction of the wiper lever 2 extends in the direction of the angle $\alpha$, and the wiper lever 2 can brush over the region of the electrically conductive layer serving as the work section 7. Contrary to the measurement movement in the direction toward the angle $\alpha$, the wiper lever 2 is deflectable out of its position of rest indicated by the line 22, about an angle $\beta$, into a testing position indicated by a dashed line 23. In the testing position corresponding to line 23, the wiper lever 2 crosses a testing face 25, which is not electrically conductive, and which is located in the extension of the permissible movement path characterized by the circular arcs 17, 18 and at a maximum has the width a of the permissible movement path, while in the longitudinal direction of the movement path 17, 18, the testing face 25 has a length b, which is sufficient for the brush wiper 5 in the test position 23 to be assured of coming to rest inside the length b of the testing face 24. The width of the brush wiper 5 in the longitudinal direction of the wiper lever 2 is less than the width of the testing face 25, or in other words less than the width a.

During a deflection of the wiper lever 2 in the direction of the angle $\alpha$, the brush wiper 5 brushes over the electrically conductive layer section serving as the work section 9. In the direction of the angle $\beta$ toward the testing position 23, the work section 9 is adjoined by an electrically conductive connecting layer 26, which leads to the pickup connection layer 16 and thereby surrounds the testing face 25 on all sides.

Upon a movement in the direction of the angle $\alpha$, the brush wiper 4 brushes over the section of the electrically conductive layer serving as the work section 7, given a correct position inside a permissible movement path having the width c, which is defined by the circular arcs 27 and 28. The permissible movement path having the width c is somewhat narrower than the width of the work section 7 at the end 13, so that the circular arcs 27 and 28 in every case extend within the end 13 of the work section 7. As with the testing face 25, the work section 7 also has a testing face 29, which is not electrically conductive, associated with it, the testing face 29 being disposed in the extension of the permissible movement path 27, 28 in the direction of the angle $\beta$ and being crossed by the wiper lever 2 in the testing position 23. The testing face 29 has a maximum width c corresponding to the permissible movement path and a length d, which suffices for the brush wiper 4, in the testing position 23, to be assured of coming to rest in the pivoting direction inside the testing face 29. The width of the brush wiper 4 in the longitudinal direction of the wiper lever 2 is less than the width of the testing face 29, that is, less than the width c. The testing face 29 is surrounded on all sides by the electrically conductive connecting layer 8, which makes the end 13 of the work section 7 communicate with the connection layer 14. The testing faces 25 and 29 can be formed by way of example by providing that when the carrier plate 1 is coated, no coating is applied to these testing faces 25, 29.

According to the method of the invention, in a testing operation for testing whether the brush wipers 4, 5 are moving within the permissible movement paths 17, 18 and 27, 28, the wiper lever 2 is deflected by the angle $\beta$ into the testing position 23. If both brush wipers 4 and 5 in the testing position 23 of the wiper lever 2 are located within the testing faces 25 and 29, respectively, then the voltage picked up at the pickup connection layer 17 jumps to the value of the supply voltage $U_o$ or to some other value not otherwise occurring, if a resistor 30 embodied as a high-ohmic resistor in comparison with the work layer 7 embodied as a resistor is disposed between the connection layer 11 and the pickup connection layer 16. However, if some portion of a brush wiper 4 or 5 portions of both brush wipers 4 and 5, in the testing position 23, touch the electrically conductive layers 8 or 26 outside the testing faces 25 or 29 in the direction of the longitudinal axis of the wiper lever 2, then the voltage occurring at the pickup connection layer 16 is zero. A zero voltage at the pickup connection layer 16 indicates an incorrect position of at least one of the brush wipers 4, 5 outside the permissible movement paths 17, 18 or 27, 28 and necessitates a correction of the position of the brush wipers with respect to the work sections 7, 9.

If in the test position 23 a voltage corresponding to the supply voltage $U_o$ or a voltage not otherwise occurring in the measurement process occurs at the pickup connection layer 16, then the brush wipers 4, 5 are moving within the permissible movement paths 17, 18 or 27, 28 and are thus located in their correct position, thereby preventing the brush wipers from moving onto the nonconductive material of the carrier plate and becoming roughened; otherwise, when the brush wipers next brush over the electrically conductive layer they might damage if not destroy it.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A method for testing the correct position of a wiper of an electric potentiometer defining a movement path relative to an electrically conductive layer having a voltage source which is to be brushed over by said wiper, comprising the steps of, providing an electrically nonconductive testing face surrounded on all sides by a portion of said conducting layer and positioned within said movement path of said wiper on a work section of said conductive layer, deflecting said wiper into a testing position crossing said testing face, and generating a signal indicative of the position of said wiper in said testing position relative to said movement path upon said work section of said conductive layer.

2. An electric potentiometer comprising a wiper defining a movement path, and an electrically conductive layer having a voltage source to be brushed over by said wiper during said movement path, said conductive layer being applied to an electrically nonconductive carrier face, and an electrically nonconductive testing surface for said wiper surrounded on all sides by an electrically conductive portion of said conductive layer and being contained within an extension of said movement path of said wiper upon a work section of said conductive layer.

3. A potentiometer as defined by claim 2, wherein said wiper is deflectable into a testing position (defined by said wiper) crossing said nonconductive testing surface.

4. A potentiometer as defined by claim 3, wherein an electrical signal generated by said voltage source is picked up by said wiper in said testing position and thereby indicates the position of said wiper relative to said movement path on said work section of said conductive layer.

5. A potentiometer as defined by claim 2, wherein said nonconductive testing surface comprises a portion of said nonconductive carrier face.

* * * * *